US011951415B2

(12) United States Patent
Canty

(10) Patent No.: US 11,951,415 B2
(45) Date of Patent: Apr. 9, 2024

(54) THEMED PIÑATA HOLDER WITH OPTIONAL SOUND FEATURES, AND RELATED METHOD OF USE

(71) Applicant: Letisha M. Canty, Watervliet, NY (US)

(72) Inventor: Letisha M. Canty, Watervliet, NY (US)

( * ) Notice: Subject to any disclaimer, the term of this patent is extended or adjusted under 35 U.S.C. 154(b) by 288 days.

(21) Appl. No.: 17/406,306

(22) Filed: Aug. 19, 2021

(65) Prior Publication Data

US 2021/0379504 A1 Dec. 9, 2021

(51) Int. Cl.
*A63H 33/00* (2006.01)
*A47G 1/06* (2006.01)
*A63H 37/00* (2006.01)
*H04R 1/02* (2006.01)

(52) U.S. Cl.
CPC ............. *A63H 37/00* (2013.01); *A47G 1/065* (2013.01); *A63H 33/00* (2013.01); *H04R 1/028* (2013.01)

(58) Field of Classification Search
CPC ......... A63H 33/00; A63H 37/00; A47G 1/065
See application file for complete search history.

(56) References Cited

U.S. PATENT DOCUMENTS 2,772,882 A 12/1956 Anson
3,673,723 A * 7/1972 Lazar ..................... A47G 1/065 40/729
3,893,669 A 7/1975 Myers
4,253,266 A 3/1981 Bajo
4,319,419 A * 3/1982 Traill ........................ G09F 1/12 40/729
4,832,337 A 5/1989 Estrada
5,242,308 A 9/1993 Estrada
(Continued)

OTHER PUBLICATIONS

"DIY Birthday Pinata" (The Sweetest Occasion) Jun. 14, 2011 (Jun. 14, 2011) [online] (retrieved from the internet on Sep. 29, 2022) <URL https://web.archive .org/Web/20110817084438/https://thesweetestoccasion.com/2011 /06/how-to-make-a-pinata/>.
(Continued)

*Primary Examiner* — John A Ricci
(74) *Attorney, Agent, or Firm* — Jay R. Yablon

(57) ABSTRACT

A themed piñata holder apparatus comprising a visual representation of a first theme, and related method, comprising: support means for physically supporting the piñata holder in a suspended position above users of the piñata; and a suspension point to which a piñata suspension connector may be attached, and from which a piñata may be suspended via the piñata suspension connector. Preferably, the piñata comprises a visual representation of a second theme; and there is a themed visual relation between the first theme of the piñata holder and the second theme of the piñata. Optionally, the piñata holder apparatus further comprises an impulse detector responsive to a change in force exerted at the suspension point when the piñata is struck by a user of the piñata; and an audio speaker for emitting predetermined audible sounds in response to a sound emission controller.

16 Claims, 3 Drawing Sheets

(56) References Cited

U.S. PATENT DOCUMENTS

| | | | | |
|---|---|---|---|---|
| 5,263,889 | A | 11/1993 | Ledonne | |
| 5,562,518 | A | 10/1996 | Estrada | |
| 6,354,904 | B1 | 3/2002 | Grey et al. | |
| 6,412,736 | B1 | 7/2002 | Zaragoza | |
| 6,544,099 | B2 | 4/2003 | Shafik | |
| 6,669,152 | B2 | 12/2003 | Hernandez | |
| 6,685,146 | B1 | 2/2004 | Sanchez, Jr. | |
| 6,951,068 | B1 * | 10/2005 | Weatherill | G09F 1/12 40/658 |
| 6,978,974 | B1 | 12/2005 | Marasco | |
| 7,006,001 | B2 | 2/2006 | Estrada et al. | |
| D542,501 | S | 5/2007 | Lopez | |
| 7,442,106 | B1 | 10/2008 | Menow | |
| D613,592 | S | 4/2010 | Clark | |
| 8,678,872 | B1 | 3/2014 | Valencia | |
| 8,721,382 | B2 | 5/2014 | Maidana Otero | |
| 9,011,277 | B2 | 4/2015 | Schell | |
| 9,156,664 | B1 | 10/2015 | Lopez | |
| 9,345,941 | B1 | 5/2016 | Celedon et al. | |
| 10,071,889 | B1 | 9/2018 | Lopez | |
| 10,288,219 | B1 | 5/2019 | Walberg | |
| 2003/0062454 | A1 | 4/2003 | Hernandez | |
| 2006/0096142 | A1 * | 5/2006 | Chen | A47G 1/0616 40/717 |
| 2007/0099534 | A1 | 5/2007 | Alas | |
| 2008/0073468 | A1 | 3/2008 | Arroyo | |
| 2012/0312937 | A1 | 12/2012 | Weber et al. | |
| 2013/0337721 | A1 | 12/2013 | Guzman | |
| 2014/0051319 | A1 | 2/2014 | Scocozza | |
| 2019/0054390 | A1 | 2/2019 | Lodal et al. | |
| 2020/0061431 | A1 | 2/2020 | Garcia Tolosa | |
| 2021/0379504 | A1 | 12/2021 | Canty | |

OTHER PUBLICATIONS

International search report for counterpart application PCT/US22/38266, dated Oct. 26, 2022.

* cited by examiner

THEMED PIÑATA HOLDER WITH OPTIONAL SOUND FEATURES, AND RELATED METHOD OF USE

BACKGROUND OF THE INVENTION

Piñatas, known to have been in existence since at least the 14$^{th}$ century, have brought joy and entertainment to children the world over as a fun party activity. Typically, a piñata is filled with candies and/or other edible items and/or other items of interest to children such as toys, suspended with a string, rope, chain or equivalent device, then struck with a stick or equivalent by (usually) blindfolded participants until someone breaks open the piñata, whereupon the all the participants set out to gleefully retrieve and consume the dispersed edibles or other items.

Piñatas themselves have many diverse visual themes. These included but are not limited to real or fanciful animals such as donkeys, cows, horses, dinosaurs, unicorns, llamas, monsters, sharks, lions and the like; inanimate objects such as balls, vehicles, stars, the sun, planets, ice creams, bottles, fruits and vegetables, rainbows, present boxes, tacos and the like; or may be themed to recognizable cartoon or comic book characters, or even to real people.

In all circumstances, some sort of means is employed to physically suspend the piñata above the participants so it can be struck. Examples of suspension devices and methods from the US patent literature include poles (U.S. Pat. No. 4,832,337), horizontal bars (U.S. Pat. No. 6,978,974, US 2012/0312937, US 2014/0051319), eyelets and/or hooks (U.S. Pat. Nos. 5,263,889, 6,354,904, US D613592), hoists (U.S. Pat. Nos. 6,412,736, 10,071,889, US D542501), frames (U.S. Pat. No. 6,669,152, US 2003/0062454), armatures (U.S. Pat. No. 6,685,146), angled pole mounts (U.S. Pat. Nos. 9,156,664, 9,345,941, 10,288,219), and pulleys (US 2007/0099534, US 2008/0073468), as well as various combinations of the foregoing. Yet, these known methods of suspending a piñata are all dull and utilitarian, contributing nothing to the joy and entertainment of striking the piñata at the piñata party.

It is also to be noted that while the prior art does reveal some piñatas with sound features (U.S. Pat. Nos. 7,006,001 and 8,678,872), these are part of the piñata itself, and do not involve any themed interaction between the piñata and the piñata holder.

It would be desirable if the devices and methods used to suspend a piñata were themed in such a way as to add joy and entertainment to the piñata party, beyond the fun provided by the piñata itself and its candy or other contents.

It would additionally be desirable if the theme used in connection with suspending the piñata bore some cognizable relation to or interaction with the piñata itself.

Finally, it would be desirable to optionally add a sound feature which further enhances the theme of the piñata holder, and the themed relation of the holder to the piñata itself.

SUMMARY OF THE INVENTION

Disclosed herein is a themed piñata holder apparatus comprising a visual representation of a first theme, and related method, comprising: support means for physically supporting the piñata holder in a suspended position above users of the piñata; and a suspension point to which a piñata suspension connector may be attached, and from which a piñata may be suspended via the piñata suspension connector. Preferably, the piñata comprises a visual representation of a second theme; and there is a themed visual relation between the first theme of the piñata holder and the second theme of the piñata. Optionally, the piñata holder apparatus further comprises an impulse detector responsive to a change in force exerted at the suspension point when the piñata is struck by a user of the piñata; and an audio speaker for emitting predetermined audible sounds in response to a sound emission controller.

Also disclosed herein is a sound-featured piñata holder apparatus, comprising: support means for physically supporting the piñata holder in a suspended position above users of the piñata; a suspension point to which a piñata suspension connector may be attached, and from which a piñata may be suspended via the piñata suspension connector; an impulse detector responsive to a change in force exerted at the suspension point when the piñata is struck by a user of the piñata; and an audio speaker for emitting predetermined audible sounds in response to a sound emission controller.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Figure 1:
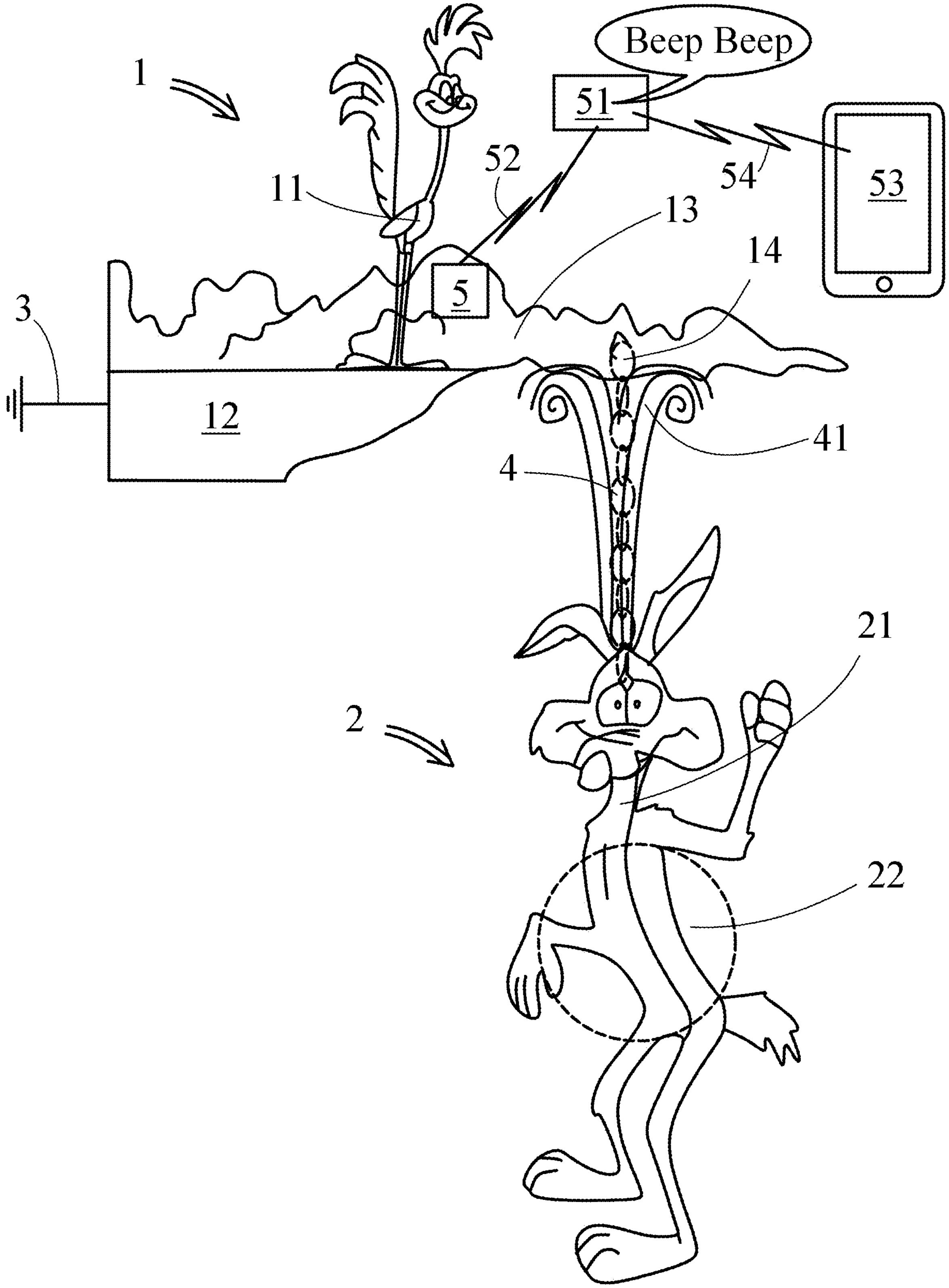
FIG. 1 illustrates, for example not limitation, an exemplary embodiment of the invention in which the piñata holder comprises the Road Runner® cartoon character and the piñata comprises the Wile E. Coyote® cartoon character.

FIG. 1 illustrates, as an example without limitation, a piñata holder and related piñata themed to the rivalry/nemesis relation between the two well-known cartoon characters Road Runner® and Wile E. Coyote®. In this example, the piñata holder 1 comprises a visual rendition of the Road Runner® 11 while the piñata 2 itself comprises a visual rendition of Wile E. Coyote® 21. In the spirit of their cartoon relationship, Road Runner® 11 is depicted standing at the edge of a cliff 12, while Wile E. Coyote® 21 is depicted to have just raced off the edge of the cliff 12 and begun to fall into the canyon below as is further illustrated by the "whoosh lines" 41 visually accentuating this downward fall. Also illustrated as part of the piñata holder 1, as is often done in the associated cartoons, is a dust cloud 13 which Wile E. Coyote® 21 created while skidding to a stop during his unsuccessful attempt to brake himself and not fall from the cliff 12. As is the case with any piñata 2, this Wile E. Coyote® 21 exemplary illustration of a piñata 2 comprises a container for candy and/or other edibles and/or toys, schematically illustrated by the hidden-line circled area 22. It will be readily appreciated how this combined visual presentation relating Road Runner® 11 and Wile E. Coyote® 21 will serve and enhance the utilitarian function of bringing entertainment, laughter and delight to children at a piñata party, beyond that which is customarily provided by a lone piñata 2 which lacks any themed relation to the means by which it is suspended.

As to the physical configuration, the piñata holder 1 is mounted and secured in an elevated position to any physical object capable of securely maintaining and supporting it in said elevated position, such but not limited to the "dull and utilitarian" methods of suspending a piñata which were reviewed in the background of the invention. This support means is illustrated by the electrical "ground" symbol referenced by 3, which is intended to schematically mean that the piñata holder 1 is physically supported in an elevated position from its side(s) and/or from above and/or from below by any and all means known in the art which can be customarily employed to elevate a piñata. The piñata holder 1 itself may contain (not shown) without limitation, one or more hooks, eyelets, sleeves, snaps, poles, bars, frames, sleeves etc. or equivalents known and used in the art for mounting to its physical support.

The piñata 2 itself is then connected to and suspended from the piñata holder 1 by a piñata suspension connector 4 device which, for example not limitation, in this illustration is embodied to be a chain. It will be noted that the piñata suspension connector 4 is illustrated in broken (hidden) lines, because it is preferably hidden behind or within the "whoosh lines" 41 used to illustrate Wile E. Coyote® 21 falling from the cliff. If the "whoosh lines" 41 are fabricated from a material with suitable strength, then they may themselves be used as the suspension connector 4 for physically connecting the piñata 2 to the piñata holder 1, without the need for a separate suspension connector 4. It will also be noted that in this exemplary illustration, the dust cloud 13 which is a part of the overall piñata holder 1 is used to provide a suspension point 14 on the piñata holder 1 from which the piñata 2 is suspended. That is, the dust cloud 13 not only illustrates the fanciful cartoon element of Wile E. Coyote® 21 having tried unsuccessfully to brake his run off the edge of the cliff, but also doubles to provide a physical suspension point 14 for the utilitarian hanging of the piñata 2 from the holder 1. It will be appreciated that this themed visual relation of the piñata suspension connector 4 to the piñata holder 1 and the piñata 2 (the "whoosh lines" 41 of Wile E. Coyote® 21 falling after having failed to catch Road Runner® 11) further enhances the entertainment utility, beyond that which is customarily provided by a piñata 2 alone which omits any themed relation to the means by which it is suspended.

Finally, the piñata holder 1 is shown to provide an optional sound feature. Specifically: the piñata holder 1 comprises an impulse detector 5 which is a device responsive to a change in the force exerted by the piñata 2 upon the piñata holder 1 through the suspension connector 4, for initiating the emission of predetermined audible sounds. Normally, the piñata 2 hanging from the piñata holder 1 will exert a constant downward force on the piñata holder 1 through the suspension connector 4 which force is due simply to the physical weight of the piñata 2. However, when the piñata 1 is successfully struck by a participant at the piñata party, the impulse from this strike will create a brief change in this downward force. In response to this change in force, the impulse detector 5 initiates the emission of a sound or a series of sounds. In this instance, as an example without limitation, the emitted sound is illustrated to be the well-known "Beep Beep" that the Road Runner® 11 makes whenever he has once again foiled the Wile E. Coyote® 21, preferably mimicking the actual Road Runner® 11 character's voice, perhaps then also followed by the sound animation of Road Runner® 11 speeding away and/or Wile E. Coyote® 21 crashing into the bottom of the canyon below. The impulse detector 5 is calibrated to detect when the change in force is commensurate with the striking of the piñata 2, so that the possibility of either a false positive or a false negative is minimized.

The foregoing sound(s) can be emitted directly from the impulse detector 5 if that device itself also compromises one or more audio speakers 51. Alternatively, impulse detector 5 may simply emit, e.g., a wireless/Bluetooth etc. electronic signal 52 (or perhaps a hard wire) which is then picked up by one or more remote audio speakers 51 from which the predetermined audible sound (in this case, "Beep Beep" etc.) is emitted.

Additionally, FIG. 1 illustrates a sound control application (App) 53 contained, for example without limitation, on the illustrated mobile phone and operated by a user of the invention. Via remote control 54 of the audio speaker(s) 51, this App 53 may be used to control which sounds or sound sequences are to emitted by the speaker(s) 51 when the piñata 2 has been struck (or at any other time). The sounds can then be changed from one strike to the next. For example, without limitation, after all the contents of the piñata 2 have been emptied, the sound sequence can be switched over to "that's all folks" accompanied by the well-known closing musical tune from Looney Tunes cartoons. For another example, without limitation, the user controlling the App 53 can cause some sound sequence (e.g., "better luck next time") to be emitted each time a child takes a swing and misses the piñata 2. For another example, without limitation, if the piñata holder 1 is manufactured such that its themed visual representation is convertible from one piñata party to the next (for example, between FIGS. 1 and 2), then the App 53 can be used to switch over the sound features to match the visual theme of the piñata holder 1 and the piñata 2 for any given party. As a final example, without limitation, the App 53 may be used entirely in lieu of the impulse detector 5: Instead of actuating the sound when the impulse detector 5 detects that the piñata 2 has been struck, the person managing the party can simply cause the sound to actuate whenever he or she sees that the piñata 2 has been struck, or sees that any other event has occurred which warrants a particular selected sound sequence. For example, the names of the children at the party van be "pre-registered" into the App 3, and a personalized message can be emitted for each child when that child takes his or her swing at the piñata 2.

In sum, the optional sound feature utilizes a sound emission controller selected from at least one of the sound emission controller group consisting of: an impulse detector 5 responsive to a physical impulse detected at the suspension point 14 when the piñata 2 is struck by a user of the piñata 2; a sound control application 53 for selecting the specific audible sounds to be emitted from the audio speaker 51; and a sound control application 53 for selecting when the audible sounds are to be emitted from the audio speaker 51.

It will be appreciated how this optional sound feature, if provided, will combine with the visual presentation to further enhance the utilitarian function of bringing entertainment, laughter and delight to children at a piñata party.

Figure 2:
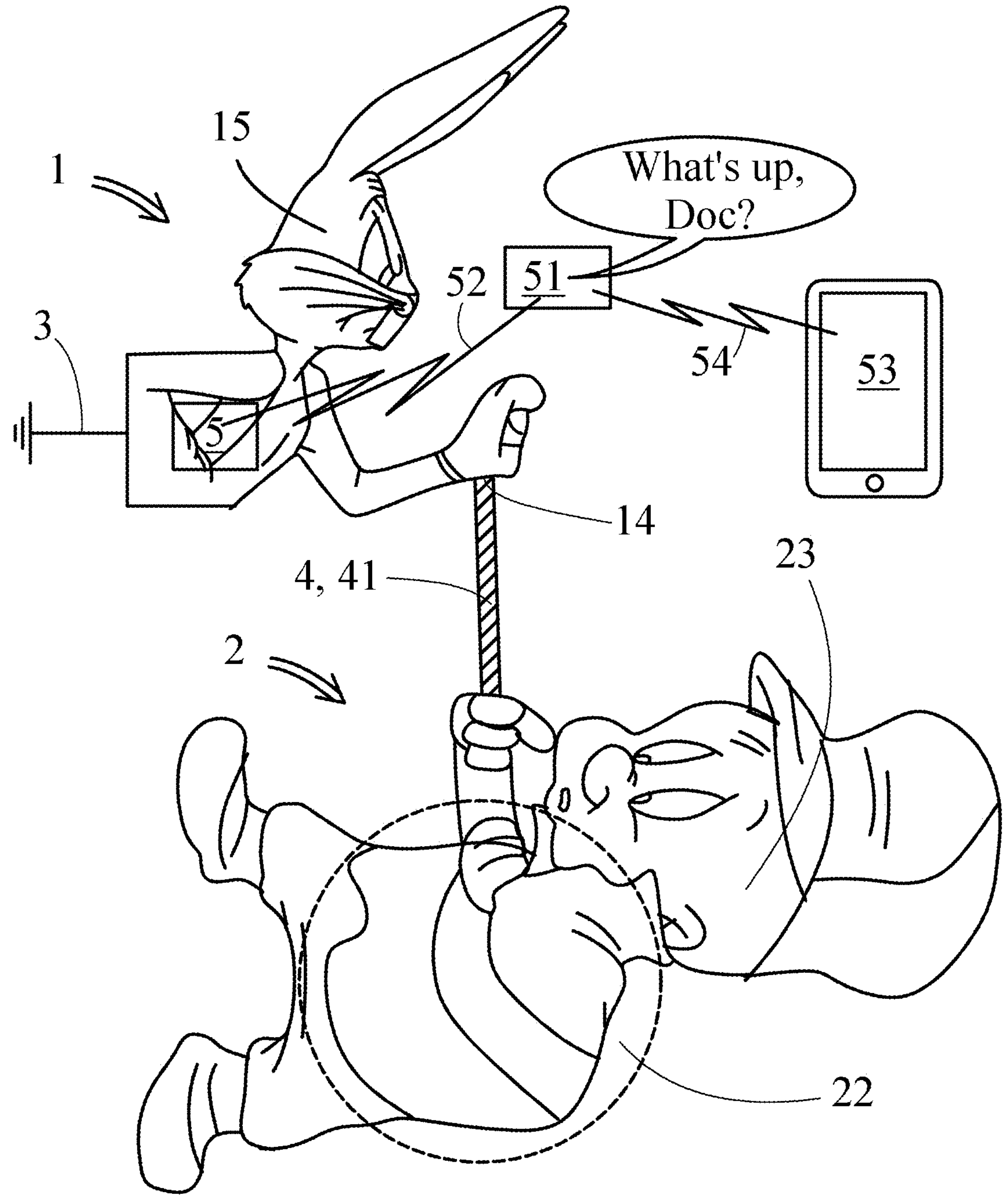
FIG. 2 illustrates, for example not limitation, an exemplary embodiment of the invention in which the piñata holder comprises the Bugs Bunny® cartoon character and the piñata comprises the Elmer Fudd® cartoon character.

FIG. 2 illustrates, as an additional example without limitation, a piñata holder and related piñata themed to the relation between the two well-known cartoon characters Bugs Bunny® and Elmer Fudd®. In this example, the piñata holder 1 comprises a visual rendition of the Bugs Bunny® 15 while the piñata 2 itself comprises a visual rendition of Elmer Fudd® 23. In the spirit of their cartoon relationship, Bugs Bunny® 15 is depicted above Elmer Fudd® 23, with the latter in danger of falling if Bugs Bunny® 15 should decide to let go of the rope 41 that both are holding on to. Again, as with any piñata 2, this Elmer Fudd® 23 exemplary illustration of a piñata 2 comprises a container for candy or other edibles, toys, etc., schematically illustrated once again by the hidden-line circled area 22. It will be readily appreciated how this combined visual presentation relating Bugs Bunny® 15 and Elmer Fudd® 23 will serve and enhance the utilitarian function of bringing entertainment, laughter and delight to children at a piñata party.

As to the physical configuration, the piñata holder 1 is again mounted and secured in an elevated position to any physical object capable of securely maintaining and supporting it in said elevated position, such but not limited to the "dull and utilitarian" methods of suspending a piñata which were reviewed in the background of the invention. This support means is again schematically illustrated by the electrical "ground" symbol referenced by 3, indicating that the piñata holder 1 is physically supported in an elevated position from its side(s) and/or from above and/or from below by any and all means known in the art which can be customarily employed to elevate a piñata.

The piñata 2 itself is again connected to and suspended from the piñata holder 1 by a piñata suspension connector 4 which, for example not limitation, in this illustration is embodied to be the rope 41. Here, the piñata suspension connector 4 (which serves the physical function of suspending the piñata 2) and the rope 41 which contributes to the theme of the piñata holder 1 are combined into one and the same invention component. The suspension point 14 on the piñata holder 1 is, in this exemplary embodiment, Bugs Bunny®'s hand. Once again, the themed relation of the piñata suspension connector 4 to the piñata holder 1 and the piñata 2 (the rope 41 which is the only thing saving Elmer Fudd® 23 while Bugs Bunny® 15 taunts him and controls his fate) further enhances the entertainment utility, beyond that which is customarily provided by a solo piñata 2 alone which lacks any themed relation to the means by which it is suspended.

Finally, the piñata holder 1 is again shown to provide an optional sound feature. Specifically, the piñata holder again 1 comprises an impulse detector 5 which is responsive to a change in the force exerted by the piñata 2 upon the piñata holder 1 through the suspension connector 4, for initiating the emission of predetermined audible sounds. As was disclosed for FIG. 1, when the piñata 1 is successfully struck by a participant at the piñata party, the impulse from this strike will create a brief change in downward force. In response to this change in force, the impulse detector 5 initiates the emission of a sound or a series of sounds. In this instance, as an example without limitation, the emitted sound is illustrated to be the well-known phrase "What's up, Doc?" that the Bugs Bunny® 15 often says to Elmer Fudd® 23 in a variety of circumstances, perhaps then also accompanied by the sound animation of Bugs Bunny® 15 chomping on a carrot or Elmer pleading for Bugs not to let go or calling Bugs a "scwewy wabbit." Preferably, this would be in voices that mimic those of the actual characters. As before, the impulse detector 5 is calibrated to detect when the change in force is commensurate with the striking of the piñata 2, so that the possibility of either a false positive or a false negative is minimized.

Additionally, FIG. 2 also illustrates a sound control App 53 contained, for example without limitation, on the illustrated mobile phone. Again, via remote control 54 of the audio speaker(s) 51, this App 53 may be used to control which sounds or sound sequences are to emitted by the speaker(s) 51 when the piñata 2 has been struck, or at any other time, as already elaborated in connection with FIG. 1 and incorporated by reference here. This includes, as disclosed earlier, using the App 53 entirely in lieu of the impulse detector 5.

Again, the foregoing sound(s) can be emitted directly from the impulse detector 5 if that device itself also compromises one or more audio speakers 51. Alternatively, impulse detector 5 may simply emit, e.g., a wired or wireless/Bluetooth etc. electronic signal 52 which is then picked up by one or more remote audio speakers 51 from which the predetermined audible sound (in this case, "Beep Beep" etc.) is emitted.

Again, it will be appreciated how this optional sound feature, if provided, will combine with the visual presentation to further enhance the utilitarian function of bringing entertainment, laughter and delight to children at a piñata party.

Figure 3:
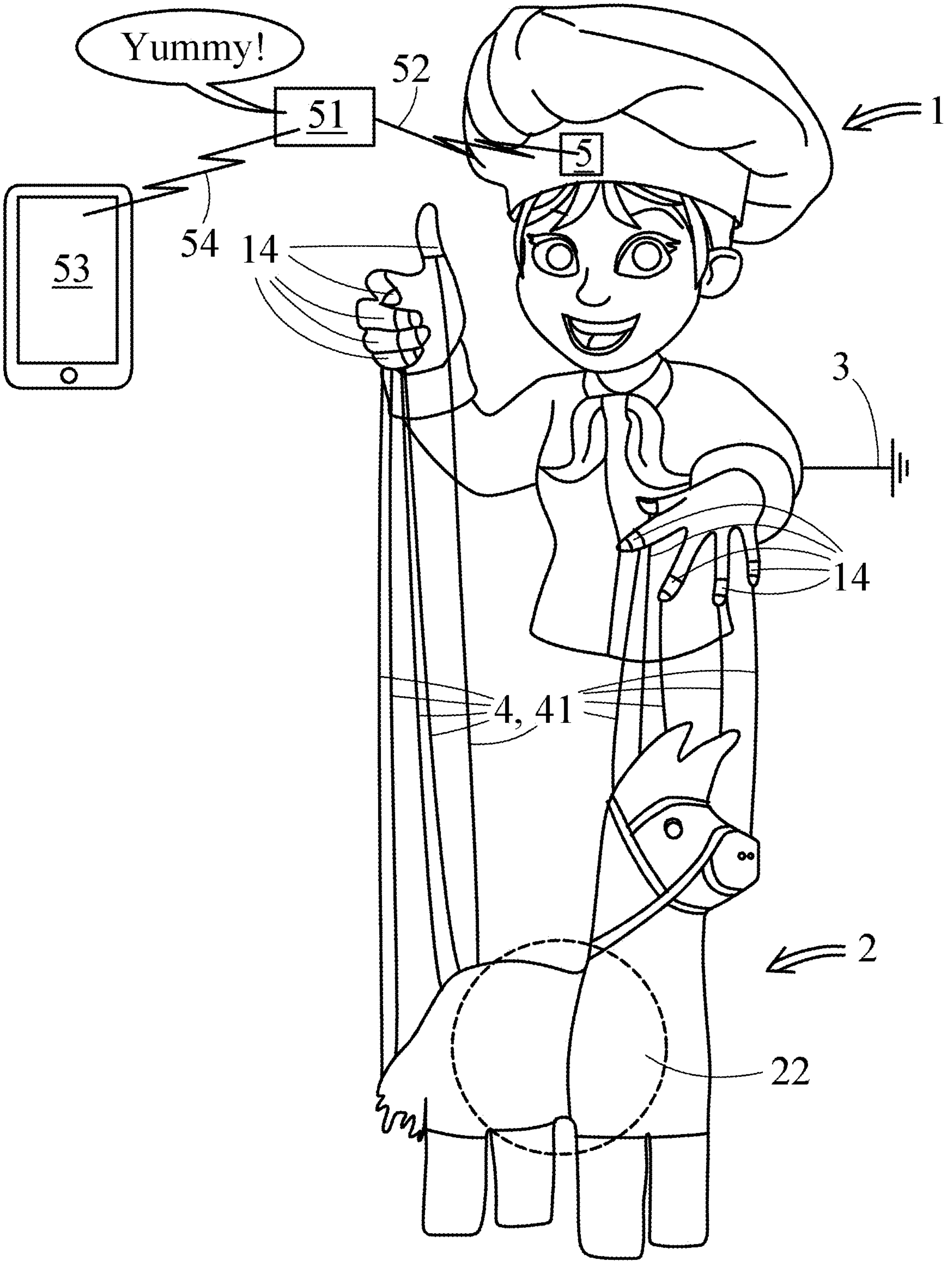
FIG. 3 illustrates, for example not limitation, an exemplary embodiment of the invention in which the piñata holder comprises a candy chef/puppeteer cartoon character and the piñata comprises a donkey.

FIG. 3 illustrates, as an additional example without limitation, an exemplary embodiment of the invention in which the piñata holder 1 comprises a candy chef/puppeteer cartoon character and the piñata 2 comprises a donkey. The piñata holder 1 is again mounted and secured in an elevated position to any physical object capable of securely maintaining and supporting it in said elevated position in any manner known in the art, with these support means again schematically illustrated by the electrical "ground" symbol referenced by 3.

Here, the piñata 2 is again connected to and suspended from the piñata holder 1 by a piñata suspension connector 4 which, for example not limitation, in this illustration is embodied to be a plurality of puppet strings 41. For this exemplary illustrative embodiment, there are a plurality of suspension points 14, namely, the chef/puppeteer's fingers. Here, as in FIG. 2, the piñata suspension connector 4 (which serves the physical function of suspending the piñata 2) and the strings 41 which contribute to the theme of the piñata holder 1 as a candy maker/puppeteer suspending her "candycraft" are again one and the same. Alternatively, similarly to in FIG. 1, if the puppet strings 41 are insufficient to physically support suspension of the piñata 2, a (preferably hidden) piñata suspension connector 4 with suspension point(s) 14 separate therefrom may be utilized. The piñata once again contains an internal compartment for candies, toys and perhaps other "goodies" for the piñata party participants. It will be again be appreciated how this combined visual presentation relating the piñata holder 1 to the piñata 2 through the piñata suspension connector 4, will serve and enhance the utilitarian function of bringing entertainment, laughter and delight to children at a piñata party, beyond that which is customarily provided by a piñata 2 which omits any themed relation to the means by which it is suspended.

Once again, the piñata holder 1 is shown to provide an optional sound feature implemented using impulse detector 5. Again, the foregoing sound(s) can be emitted directly from the impulse detector 5 compromising, or connected with via a wired or wireless/Bluetooth etc. electronic signal 52, one or more remote audio speakers 51 from which a predetermined audible sound is emitted. In this illustration, the piñata holder 1 is telling the piñata partygoers how "yummy" her candy will be, with perhaps other suitable exclamations such as "good job."

Again, as with the previous FIGS. 1 and 2, FIG. 2 illustrates a sound control App 53 contained, for example without limitation, on the illustrated mobile phone. Again, via remote control 54 of the audio speaker(s) 51, this App 53 may be used to control which sounds or sound sequences are to emitted by the speaker(s) 51 when the piñata 2 has been struck, or at any other time, as already elaborated earlier and incorporated by reference here. And this includes, as also disclosed earlier, using the App 53 entirely in lieu of the impulse detector 5.

What is common to all three of the non-limiting illustrative invention embodiments of FIGS. 1-3, is that the piñata holder 1 is not a dull bar or pole or other strictly utilitarian device which holds a piñ, but rather, comprises a visual representation of a first theme which, for example not limitation, is a character (respectively, Road Runner®, Bugs Bunny® and the candy chef/puppeteer), and that there is a themed visual relation between the piñata holder 1, and the piñata 2 which comprises a visual representation of a second theme which is a related character (respectively, Wile E. Coyote®, Elmer Fudd® and the donkey). Moreover, each piñata holder 1 comprises a suspension point(s) 14 to which a piñata suspension connector(s) 4 may be attached (respectively, Coyote's dust cloud, Bugs' hand and the chef's fingers), and from which the piñata 2 may be suspended via the piñata suspension connector(s) 4, 41 (respectively, the chain hidden behind the "whoosh lines," the rope, and the puppet strings). And of course, the piñata holder comprises support means 3 (e.g., without limitation, hooks, eyelets, sleeves, snaps, poles, bars, frames, sleeves etc. and equivalents) for physically supporting the piñata holder in a suspended position above users of the piñata. Finally, in all of FIGS. 1-3 there is a themed visual relation among the first theme of the piñata holder 1, the second theme of the piñata 2, and the piñata suspension connector 4. In FIG. 1, this themed visual relation is Wile E. Coyote® "falling" below Road Runner® suspended by his "whoosh," in FIG. 2 this is Bugs suspending Elmer from a rope, and in FIG. 3 this is the puppeteer/chef suspending the donkey with puppet strings.

It is to be understood that the piñata holder 1 of the invention may be produced and distributed independently of the piñatas 2 which may be suspended therefrom, and independently of the piñata suspension connectors 4 via which the piñatas 2 may be suspended from the piñata holder 1. It is recognized, however, that to develop the themed visual relation among the foregoing, that it may be desirable for these to be produced and distributed as an overall "package."

What should also be very clearly understood, is that the drawings shown here are used as examples, without limitation, to illustrated the themed piñata holder and its physical, thematic, and optionally audible relation to the piñata itself. Any configuration for a piñata holder which meets these thematic requirements, as claimed, fall within the scope of this invention and the exclusionary rights granted by this patent.

In FIGS. 1 and 2, the theme was nemesis/adversarial relation between the characters of the piñata holder 1 and the piñata 2. In FIG. 3 the theme was a chef presenting her candy in the guise of a puppeteer. Without limitation, and as illustrative examples only, other themed visual relations—character or otherwise—between the piñata holder 1, and the piñata 2 may include the following:

Sports themes: For example, a basketball player, or the player's hand, may serve as the piñata holder 1, and a basketball as the piñata 2. The piñata suspension connector 4 could be a durable spring, so that the ball suspended from the hand can oscillate in the nature of a dribbled basketball. For another example, symbolically, the logo of one sports team of which the piñata user is a fan, may be used as the piñata holder 1. Logos of opposing sports teams may be used as the piñata 2. When the favored team defeats the rival team, the logo of the rival team may be suspended from that of the favored team and used as the piñata to be struck, without limitation, by a baseball bat or club.

Comic book themes: There are an abundance of comic book characters and their evil nemesis that can be used respectively as the piñata holder 1 and piñata 2. Superman and Lex Luthor. Batman and Joker (among others). Spiderman and his supervillains. As noted, the piñata suspension connectors 4 may also be part of the theme. For example, a spider web is ideal for suspension in any Spiderman theme.

Food: An apple tree branch may be the piñata holder 1, and an apple may be the piñata 2. Themes may be from cereal boxes, and without limitation, a spoon may be used to hit the piñata 2. Themes may also be from fast food such as McDonald's®.

Politics: A favored politician is the piñata holder 1, and a disfavored one is the piñata 2.

Science and astronomy: Planets, moons, planetary rings, the sun, the stars, may all be part of a theme. For example, the sun may be the piñata holder 1, and one or more planets illustrated to be orbiting the sum may be the piñata(s) 2. The sun, clouds, rainbows, etc. may be used to present a weather theme, with a piñata holder 1 themed as the sun, suspending a piñata 2 which is themed as a cloud. Striking the piñata 2 makes the cloud go away to reveal the sun and/or perhaps a rainbow.

If the piñata holder 1 contains characters with one or two arms/hands as was the case with all of FIGS. 1, 2 and 3, extension of the arm(s) of the characters can be in an abduction or adduction form. The arm(s) may be in the shape of extensional hug. As appropriate, hands can be featured in directions above or below the holder.

The themed relation between the piñata holder 1 and the piñata 2 may be a rivalry/nemesis relation between characters such as was illustrated in FIGS. 1 and 2, or it may be a positive association such as, for example only, the chef/puppeteer in FIG. 3 who is proud of the candy she is offering to the children in the piñata 2.

If the these are based on real or fictitious human or animal characters, the entirety of the body of the character(s) may be illustrated as with both characters in FIG. 1, as with Fudd in FIG. 2, and as with the donkey in FIG. 3. Alternatively, only part of the body may be illustrated as with Bugs in FIG. 2 and the chef/puppeteer in FIG. 3.

In all cases, the piñata 2 and the piñata holder's 1 visual representations of a theme can be a real or fictitious or symbolic human or animal character, or some other such as those mentioned above by way of example not limitation. What is important as regards the invention, is that the piñata holder 1 comprises a visual representation of a first theme, that the piñata 2 comprises a visual representation of a second theme, and that there is a themed visual relation between the two which enhances the joy, entertainment, laughter and delight for the participants at any piñata party.

As to the sounds, phrases, word sequences, etc. emitted by the audio speaker(s) 51, these may be pre-recorded, or may be generated by a sound simulator device and/or computer application/program. And as mentioned, for known characters with known voices, preferably, these recordings or simulations will mimic the actual character voices.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A themed piñata holder apparatus, comprising:
- a visual representation of a first theme comprising a character selected from the group consisting of: a real human character; a real animal character, a fictitious human character; and a fictitious animal character;
- a piñata comprising a visual representation of a second theme selected from the group consisting of: a real human character; a real animal character, a fictitious human character; a fictitious animal character; an inanimate object; and a symbol;
- support means for physically supporting said piñata holder in a suspended position above users of said piñata;
- a suspension point to which a piñata suspension connector may be attached, and from which said piñata may be suspended via the piñata suspension connectors and
- a themed visual relation between said first theme of said piñata holder and said second theme of said piñata, selected from the group consisting of: a relation between said piñata holder and said piñata; and an interaction between said piñata holder and said piñata; wherein:
- said piñata holder is situated above said piñata, and said piñata holder being above said piñata is part of said themed visual relation.

2. The apparatus of claim 1, further comprising the piñata suspension connector;
- said piñata suspension connector comprising a third visual theme selected from the group consisting of: a relation between said piñata holder and said piñata; and an interaction between said piñata holder and said piñata; and
- a themed visual relation among said first theme of said piñata holder, said second theme of said piñata, and said third theme of said piñata suspension connector.

3. The apparatus of claim 1, further comprising said piñata suspension connector.

4. The apparatus of claim 1, further comprising:
- an audio speaker for emitting predetermined audible sounds in response to a sound emission controller; and
- said sound emission controller selected from at least one of the sound emission controller group consisting of: an impulse detector responsive to a physical impulse detected at said suspension point when the piñata is struck by a user of the piñata; a sound control application for selecting the specific said audible sounds to be emitted from said audio speaker; and a sound control application for selecting when said audible sounds are to be emitted from said audio speaker.

5. The apparatus of claim 4, further comprising:
- a themed relationship between said predetermined audible sounds and at least said first theme of said themed piñata holder apparatus.

6. The apparatus of claim 4, further comprising:
- said audio speaker being part of the same device comprising said impulse detector.

7. The apparatus of claim 4, further comprising:
- said audio speaker being a device being physically separate from said impulse detector, and connected thereto by a wired or wireless electronic signal.

8. A method for suspending a piñata using a themed piñata holder, comprising the steps of:
- providing a themed piñata holder comprising a visual representation of a first theme comprising a character selected from the group consisting of: a real human character; a real animal character, a fictitious human character; and a fictitious animal character;
- providing a piñata comprising a visual representation of a second theme selected from the group consisting of: a real human character; a real animal character, a fictitious human character; a fictitious animal character; an inanimate object; and a symbol;
- physically supporting said piñata holder in a suspended position above users of the piñata using support means therefor;
- attaching a piñata suspension connector from which the piñata is suspended, to a suspension point of said themed piñata holder;
- providing a themed visual relation between said first theme of said piñata holder and said second theme of the piñata, selected from the group consisting of: a relation between said piñata holder and said piñata; and an interaction between said piñata holder and said piñata; and
- situating said piñata holder above said piñata, and incorporating said piñata holder being above said piñata into said themed visual relation.

9. The method of claim 8, further comprising the steps of:
- providing the piñata suspension connector comprising a third visual theme selected from the group consisting of: a relation between said piñata holder and said piñata; and an interaction between said piñata holder and said piñata; and
- providing a themed visual relation among said first theme of said piñata holder, said second theme of the piñata, and said third theme of the piñata suspension connector.

10. The method of claim 8, further comprising the steps of:
- emitting predetermined audible sounds using an audio speaker therefor, in response to a sound emission controller; and
- controlling said predetermined audible sounds using a sound emission controller selected from at least one of the sound emission controller group consisting of: an impulse detector responsive to a physical impulse detected at said suspension point when the piñata is struck by a user of the piñata; a sound control application selecting the specific said audible sounds to be emitted from said audio speaker; and a sound control application selecting when said audible sounds are to be emitted from said audio speaker.

11. The method of claim 10, further comprising:

said predetermined audible sounds having a themed relationship with at least said first theme of said themed piñata holder apparatus.

12. The method of claim 10, further comprising the step of:

providing said audio speaker as part of the same device comprising said impulse detector.

13. The method of claim 10, further comprising the steps of:

providing said audio speaker as a device physically separate from said impulse detector;

and connecting said audio speaker to said impulse detector by a wired or wireless electronic signal.

14. A sound-featured piñata holder apparatus, comprising:

support means for physically supporting said piñata holder in a suspended position above users of a piñata;

a suspension point to which a piñata suspension connector may be attached, and from which a piñata may be suspended via the piñata suspension connector;

an audio speaker for emitting predetermined audible sounds in response to a sound emission controller; and said sound emission controller selected from at least one of the sound emission controller group consisting of: an impulse detector responsive to a physical impulse detected at said suspension point when the piñata is struck by a user of the piñata; a sound control application for selecting the specific said audible sounds to be emitted from said audio speaker; and a sound control application for selecting when said audible sounds are to be emitted from said audio speaker; wherein:

said piñata holder is selected from the group consisting of: a real human character; a real animal character, a fictitious human character; and a fictitious animal character;

said piñata is selected from the group consisting of: a real human character; a real animal character, a fictitious human character; a fictitious animal character; an inanimate object; and a symbol;

and a theme of said predetermined audible sounds is selected from the group consisting of: a relation between said piñata holder and said piñata; and an interaction between said piñata holder and said piñata.

15. The apparatus of claim 14, further comprising:

said audio speaker being part of the same device comprising said impulse detector.

16. The apparatus of claim 14, further comprising:

said audio speaker being a device being physically separate from said impulse detector, and connected thereto by a wired or wireless electronic signal.

* * * * *